United States Patent [19]

Nakagawa et al.

[11] Patent Number: 5,336,024
[45] Date of Patent: Aug. 9, 1994

[54] PRECISION DRILLING METHOD

[75] Inventors: Teruo Nakagawa, Shijonawate; Shigeki Fujiwara, Izumiotsu, both of Japan

[73] Assignee: Matsushita Electric Works, Ltd., Osaka, Japan

[21] Appl. No.: 18,392

[22] Filed: Feb. 17, 1993

[51] Int. Cl.$^5$ .............................................. B23B 35/00
[52] U.S. Cl. ................... 408/1 R; 364/474.16; 364/474.19; 408/8; 408/13
[58] Field of Search ............ 408/1 R, 8, 10, 11, 408/13, 237, 143; 364/474.16, 474.17, 474.19

[56] References Cited

U.S. PATENT DOCUMENTS 5,027,280  6/1991  Ando et al. ............... 364/474.16

FOREIGN PATENT DOCUMENTS

| | | |
|---|---|---|
| 61-30310 | 2/1986 | Japan . |
| 61-244404 | 10/1986 | Japan . |
| 62-162405 | 7/1987 | Japan . |
| 348802 | 12/1992 | Japan ................... 408/1 R |
| 348803 | 12/1992 | Japan ................... 408/1 R |

*Primary Examiner*—Daniel W. Howell
*Attorney, Agent, or Firm*—Armstrong, Westerman, Hattori, McLeland & Naughton

[57] ABSTRACT

In a precision drilling method for drilling a straight hole in a work with a drill, a drill unit for rotating the drill is supported to a housing in suspension by an electromagnetic force consisting of separately controllable restoring and damping elements. The drill unit is supported by first restoring and damping elements such that a positional displacement of the drill unit is permitted to relieve a contacting pressure applied to the drill unit when the drill comes into contact with the work. The positional displacement of the drill unit is monitored by sensors. When a force applied to the drill unit, which is determined according to thus monitored displacement, is greater than a critical value, the first restoring element is increased to give a relatively strong support capable of rapidly restoring the position of the drill unit, and preferably the first damping element is also increased to rapidly damp a vibration of the drill unit induced by the positional displacement. Subsequently, the straight hole is drilled in the work with the drill by feeding the housing toward the work. As a result, it is possible to form the straight hole precisely at a desired position in the work without causing a breakage of the drill.

19 Claims, 13 Drawing Sheets

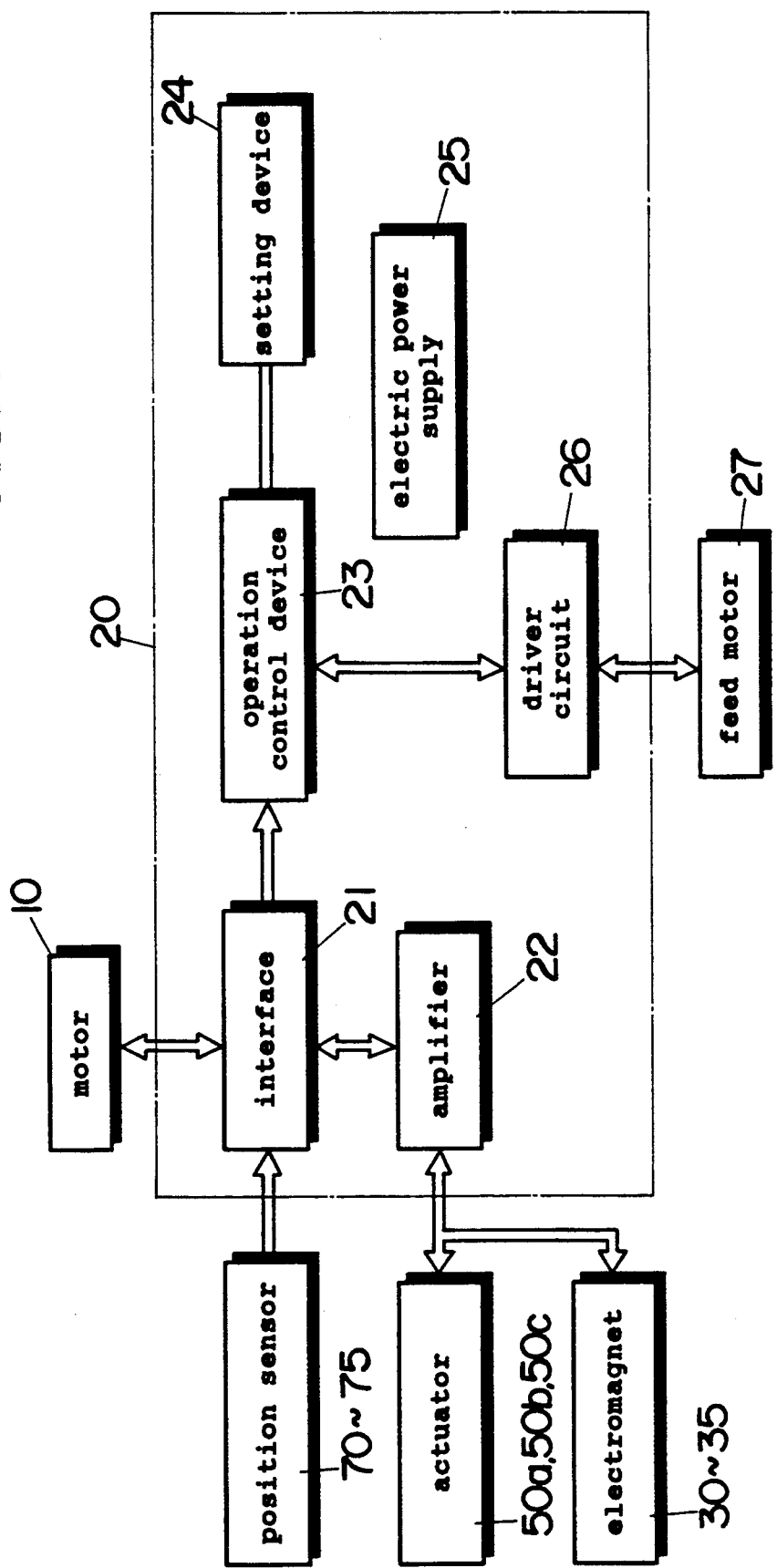

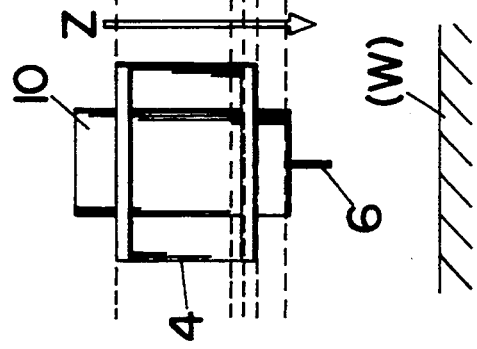

PRECISION DRILLING METHOD

BACKGROUND OF THE INVENTION

1. Field of the Invention

The present invention relates to a precision drilling method for drilling a straight hole in a work with a drill.

2. Description of the Prior Art

Generally, a drill having a small diameter is elastically bent by applying a relatively small stress to the drill. For example, when a contacting pressure, which results from contacting the drill rotating at a high speed with a work, is applied to the motor, there is a possibility of the top of the drill slipping on the work. In this case, as shown in FIG. 1A, the drill (D) is elastically bent so as to incline against the axis of a rotating device (R) for rotating the drill. When thus bent drill is fed toward the bottom of the work (W), a curved hole corresponding to the bent drill (D) will be formed in the work (W), as shown in FIG. 1B. Moreover, when a larger force than an elastic limit of the drill is applied to the drill, there is a possibility of causing a breakage of the drill.

Japanese Patent Early Publication [KOUKAI] No. 61-244404 describes about a method of drilling a deep hole in a printed circuit board with a drill. That is, in case of drilling the deep hole, the depth of which is 6 times or more of the diameter of the drill, in the printed circuit plate, a shallow hole is firstly drilled in the printed circuit board with a short drill, and then the deep hole is formed in the printed circuit board by drilling the shallow hole more deeply with a long drill. Since an amount of elastic deformation of the short drill is smaller than that of the long drill having the same diameter as the short drill, the shallow hole is easily drilled in the printed circuit board with the short drill without substantially causing the elastic deformation of the short drill. In addition, inasmuch as the top of the long drill is set in the shallow hole, the long drill may be smoothly fed into the printed circuit board to form the deep hole. However, in this prior art, after the shallow hole is drilled with the short drill, the long drill must be accurately transferred again to the position of the shallow hole. Therefore, for example, it is necessary for using an expensive X-Y table with a considerable precision.

On the other hand, Japanese Patent Early Publication [KOUKAI] No. 61-30310 describes about a drilling apparatus capable of preventing a breakage of the drill. As illustrated in FIGS. 17 and 18, the drilling apparatus comprises a rotatable spindle 11b supported in a spindle housing 15B, a driving device 12B for rotating the spindle 11B, a feed motor 23B for transferring the spindle housing 15B along the axial direction of the spindle 11B, a sensor 70B attached to a spindle housing 15B for monitoring a positional displacement of the spindle 11B along the axial direction of the spindle without physical contact, and a work-holding table(not shown), etc. An output signal from the sensor 70B is sent to an exchanging device 20B including an amplifier, so that an output signal corresponding to an axial force applied to the spindle is obtained from the exchanging device 20B. And then, the output signal from the exchanging device 20B is sent to a comparator 21B. In addition, an output signal corresponding to a critical value supplied from a setting device 22B is sent to the comparator 22B. In the comparator 22B, the output signal from the exchanging device 20B is compared with the output signal from the setting device 22B. When the output signal from the exchanging device 20B is smaller than that from the setting device 22B, that is, the axial force is smaller than the critical value, a drill 6B connected with the spindle 11B is stably fed toward the bottom of a work by the feed motor 23B. However, when the axial force is larger than the critical value, the drilling operation is stopped, the spindle housing 25B is transferred by the feed motor 23B until the drill is removed from the work, and then the drilling operation is started again to form a desired hole in the work. Therefore, since the axial force larger than the critical value is not applied to the drill 6B during the drilling operation, the breakage of the drill is effectively prevented.

Japanese Patent Early Publication [KOUKAI] No. 62-162405 describes another method of preventing the breakage of the drill. Since a rotatable spindle of a motor is connected with the drill through a magnetic joint portion, a phase shift between rotations of the spindle and the drill occurs at the magnetic joint portion in the drilling operation. That is, as a torque applied to the drill increases, the phase shift is larger. The torque applied to the drill can be obtained by detecting the phase shift. When the torque is larger than a critical value, the drilling operation is stopped, and then the drill is removed from the work. After scraps of the work are cleaned, the drilling operation is started again to form a desired hole in the work. In this prior art, since the torque larger than the critical value is not applied to the drill during the drilling operation, the breakage of the drill is effectively prevented.

SUMMARY OF THE INVENTION

The present invention relates to a precision drilling method for drilling a straight hole in a work with a drill. A drill unit is movably supported to a housing by electromagnetic force consisting of separately controllable restoring and damping elements. The drill is connected with a rotatable spindle of the drill unit. The housing has a vertical axis along which it is advanced toward the work. The drill unit is also supported to the housing such that the axis of the drill unit is substantially equal to the direction of the vertical axis. As described above, when the drill (D) is contacted with the work (W), a contacting pressure is applied to the drill (D), so that there is a problem of causing an elastic bending of the drill or a breakage of the drill when the contacting pressure is larger than the elastic limit of the drill, as shown in FIGS. 1A and 1B. However, in the present invention, the problem can be avoided by controlling a stiffness value of the restoring element and preferably a damping factor value of the damping element during the precision drilling. That is, the stiffness value of the restoring element is set to a first stiffness value such that a positional displacement of the drill unit (R) relative to the housing is permitted in a proper direction of relieving the contacting pressure applied to the drill (D) when the drill first comes into contact with the work (W). For example, the drill unit (R) is inclined to relieve the contacting pressure without substantially slipping the top of the drill on the work (W), as shown in FIG. 2A. The damping factor value of the damping element is set to a first damping factor value to damp a vibration of the drill unit induced by the drill rotating at the high speed. A force applied to the drill unit when the drill first comes into contact with the work is monitored with respect to at least one of the directions along and about three mutually perpendicular axes including the vertical axis. When thus monitored force is greater than a critical value, the first stiffness value is varied to a second stiffness value in order to give a relatively strong support capable of rapidly restoring the position of the drill unit, as shown in FIG. 2B, and holding the drill unit stably for proceeding the drilling of the straight hole. After restoring the position of the drill unit, the housing is fed toward the work along the vertical axis, so that the straight hole is drilled in the work with the drill without causing the elastic bending or the breakage of the drill.

It is a primary object of the present invention to provide a precision drilling method for drilling a straight hole in a work with a drill, which comprises the step of controlling a restoring element for relieving a contacting pressure applied to the drill when the drill comes into contact with the work.

By the way, since the positional displacement of the drill unit is apt to induce a vibration of the drill unit, there is a possibility of drilling a larger hole than the diameter of the drill in the work. In the present invention, the vibration of the drill unit can be damped by controlling the damping factor value of the damping element. That is, the first damping factor value is varied to a second damping factor value when the force applied to the drill unit is greater than the critical value in order to rapidly damp the vibration of the drill unit. As a result, the straight hole having the substantial same diameter as the drill is readily drilled in the work without causing the vibration of the drill unit.

It is another object of the present invention to provide a precision drilling method for drilling a straight hole in a work with a drill, which comprises the steps of controlling a restoring element for relieving a contacting pressure applied to the drill unit when the drill comes into contact with the work, and also controlling a damping element for rapidly damping a vibration of the drill.

In a further preferred embodiment of the present invention, the force applied to the drill unit is measured in terms of an amount of the positional displacement of the drill unit relative to the housing with respect to at least one of the directions along and about the three mutually perpendicular axis, and preferably in the direction of at least along and about the vertical axis.

In another preferred embodiment of the present invention, the drill unit is permitted to move relative to the housing in directions along and about the three mutually perpendicular axis, and preferably only in directions about two mutually perpendicular axes perpendicular to the vertical axis, or preferably only in directions along the three mutually perpendicular axes, and is supported to the housing with the restoring and damping elements acting in these direction.

It is another preferred that the restoring and damping elements are controlled to vary their stiffness and damping factor values in order to allow the drill unit to receive restoring translational and rotational movements along and about the three mutually perpendicular axes, and preferably only along and about two mutually perpendicular axis perpendicular to the vertical axis, or preferably only about two mutually perpendicular axes perpendicular to the vertical axis.

Other features, objects and advantages of the present invention will become more apparent from the following description about the preferred embodiments taken with reference to the accompanying drawings.

BRIEF DESCRIPTION OF THE DRAWINGS

FIG. 7 is an electrical schematic diagram for proceeding the precision drilling method in the first embodiment;

FIGS. 8A to 8E are schematic diagrams helpful understanding a precision drilling method in the first embodiment;

DETAILED DESCRIPTION OF THE PREFERRED EMBODIMENTS

Embodiments of a precision drilling method of the present invention are explained below. However, the present invention is not limited by the embodiments.

First Embodiment <FIGS. 3 to 14>

Figures 1A, 1B:
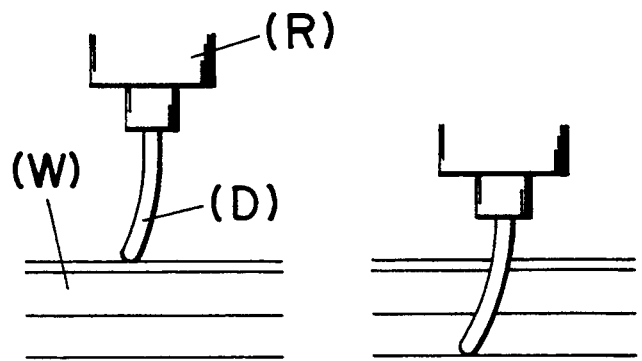
FIGS. 1A and 1B are schematic diagrams helpful understanding an elastic bending of a drill occurring when the drill comes into contact with a work.
Figures 2A, 2B:
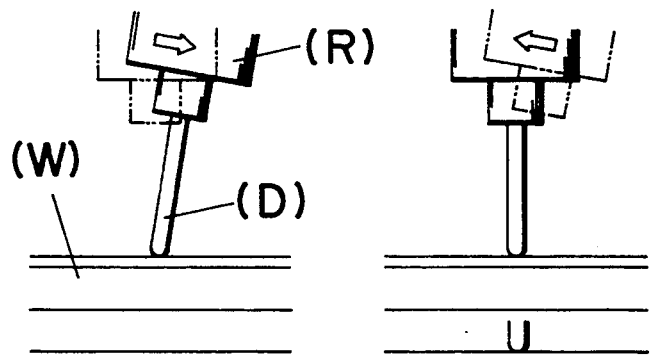
FIGS. 2A and 2B are schematic diagrams helpful understanding a precision drilling method of the present invention.
Figure 3:
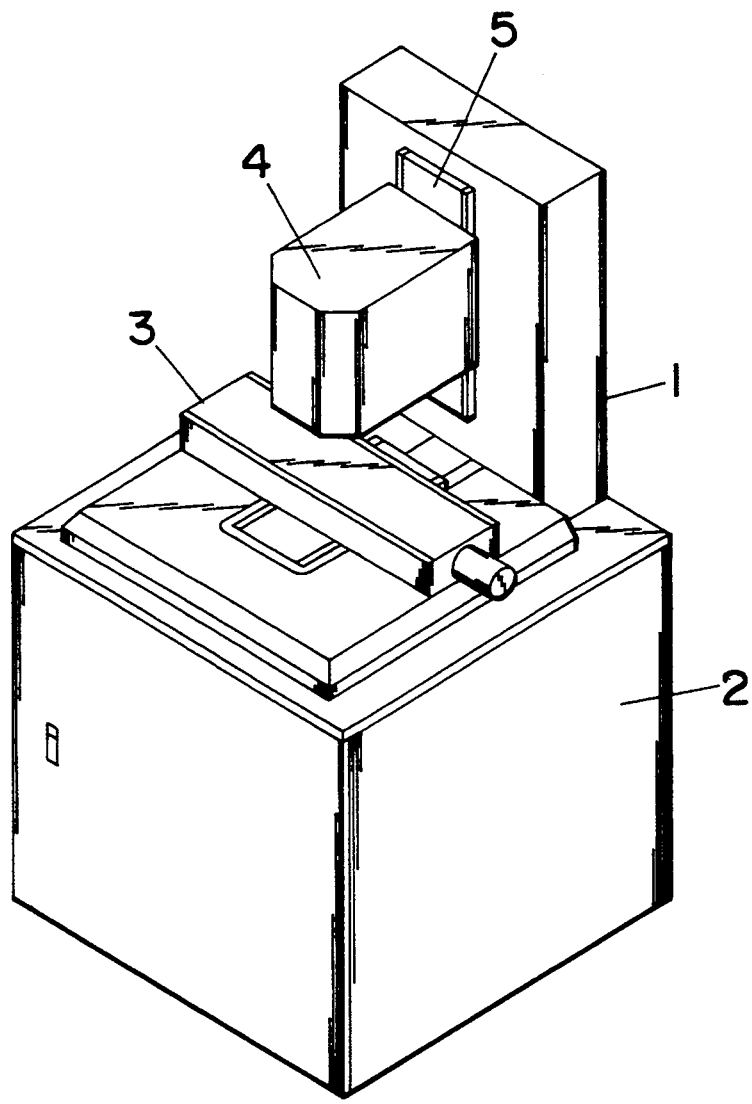
FIG. 3 is a perspective view of a drilling apparatus used in a first embodiment of the present invention.

As shown in FIG. 3, a drilling apparatus 1 for proceeding the precision drilling basically comprises a base frame 2, a X-Y table 3 for holding a work to the base frame 2, a housing 4 with a built-in motor supporting structure, and a Z table 5 for movably supporting the housing 4. The housing 4 can be transferred along a vertical axis, which is defined as Z axis in the first embodiment. A plane perpendicular to the Z axis is defined as a X-Y plane having orthogonal X and Y axes. The motor supporting structure is explained below in accordance with the drawing of FIG. 4. A supporting disc 13 fixed to a motor 10 having a rotatable spindle 11 through a motor holder 12 is supported in suspension in the housing 4 by magnetic attraction forces which are developed by electromagnets 30 to 35. The supporting disc 13 is attached to the motor through the motor holder 10 such that the supporting disc are arranged perpendicularly to the axial direction of the spindle 11. The axial direction of the spindle is substantially equal to the direction of the Z axis. On the other hand, three pairs of cylindrical electromagnets 30 and 33, 31 and 34, 32 and 35, are respectively located 120° apart around the periphery of the motor holder 12, and are respectively fixed to the housing 4 without physical contact with the supporting disc 13. One electromagnet of each pair, for example, the electromagnet 30, is arranged above the supporting disc 13 without the physical contact. The other electromagnet of each pair, for example, the electromagnet is arranged below the supporting disc without the physical contact. In addition, the electromagnets of each pair, for example, the electromagnets 30 and 33, are respectively arranged above and below the supporting disc 13 such that the axes of both cylindrical electromagnets 30 and 33 are in a straight parallel to the Z axis. The supporting disc 13 is made of a magnetic material, at least in the vicinity of the electromagnets 30 to 35. By controlling the magnetic attraction force developed by each electromagnet, it is possible to allow the motor 10 to receive a rotational movement about the X and Y axes, and a translational movement in the direction of the Z axis. Therefore, since the motor 10 is supported in suspension by the magnetic attraction forces, the motor is permitted to freely translate along the Z axis and/or rotate about the X and Y axes.

Figure 4:
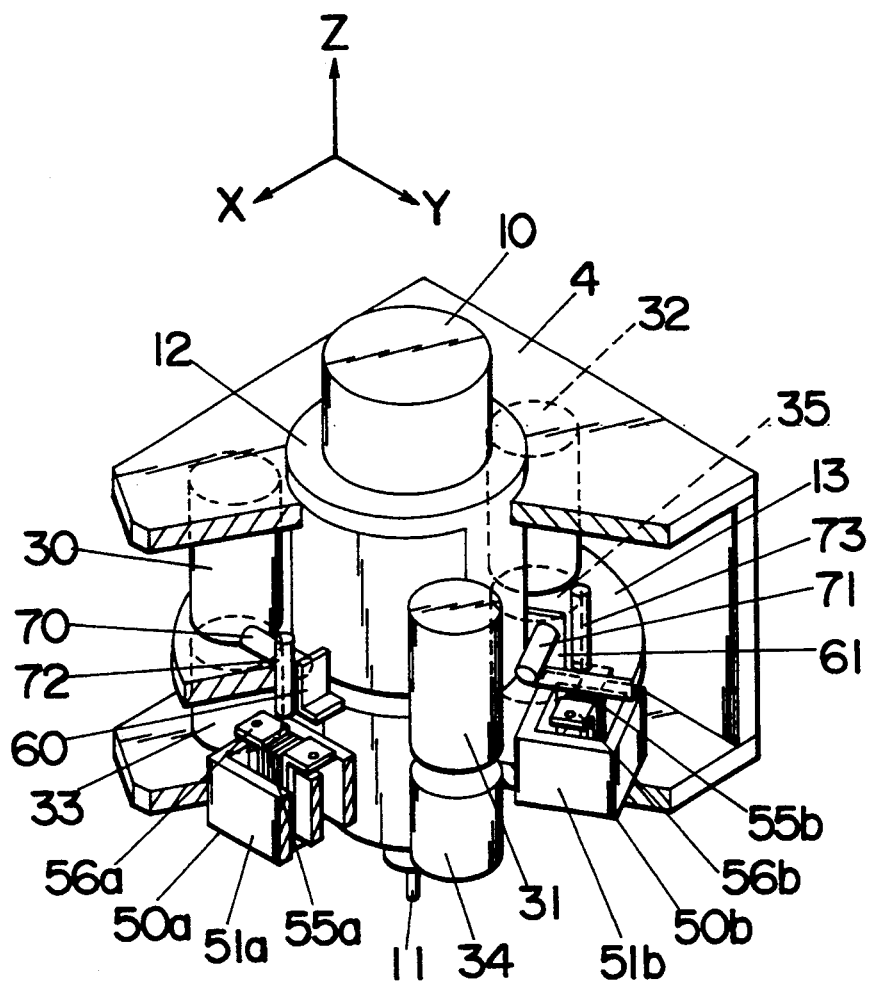
FIG. 4 is a partially cut-away perspective view illustrative of a motor supporting system in the first embodiment.
Figure 6:
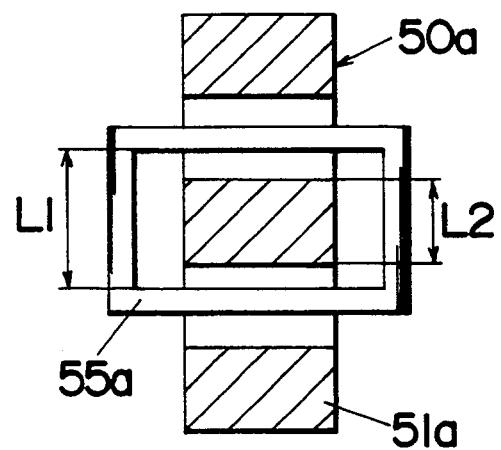
FIG. 6 is a vertical cross sectional view of the actuator in the supporting system of the first embodiment.
Figure 5:
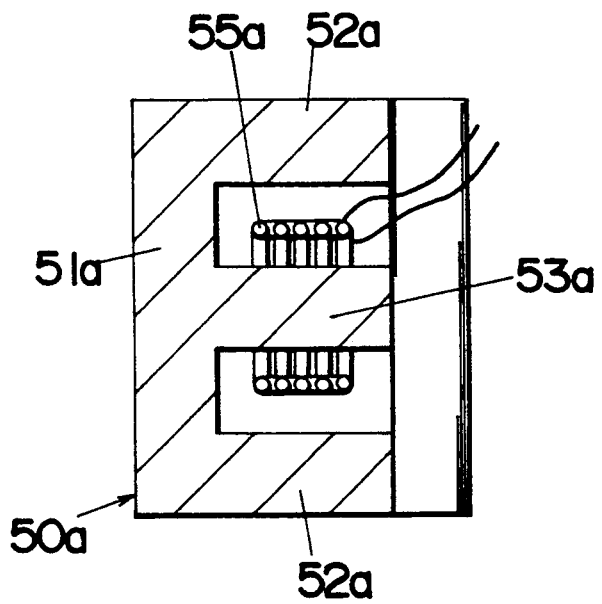
FIG. 5 is a horizontal cross sectional view of an actuator arranged in the supporting system of the first embodiment.

On the other hand, three linear actuators 50a, 50b and 50c (not shown) are respectively located 120° apart around the periphery of the motor holder 12 and below the supporting disc 13, as shown in FIG. 4. The linear actuator is also called as a voice coil motor. As illustrated in FIGS. 5 and 6, for example, the actuator 50a comprises a stator 51a substantially consisting of side permanent magnet portions 52a with the same magnetic pole and a center permanent magnet portion 53a with the opposite magnetic pole, and a movable coil 55a having the core of the center permanent magnet portion 53a. The stator 51a is fixed to the housing 4. The movable coil 55a is formed by coiling a wire around a coil bobbin having the shape of a rectangular tube which is made of a synthetic resin, etc. When a DC current is passed through the movable coil 55a, the movable coil 55a is moved along the axial direction of the movable coil 55a by an electromagnetic force, that is, Lorentz force. The electromagnetic force increases in proportion to an amount of the current, and works in the direction perpendicular to both directions of the current and magnetic flux occurring between the side and center permanent magnet portions 52a and 53a. The movable coil 55a is connected with the supporting disc 13 through an attachment 56a such that the axial direction of the movable coil 55a is substantially equal to the tangent direction of the supporting disc 13 at the connected position of the attachment 56a. Similarly, the movable coils 55b and 55c (not shown) of the actuators 50b and 50c are respectively connected with the supporting disc through attachments 56b and 56c (not shown). Therefore, it is possible to allow the motor to receive a rotational movement about the Z axis when the movable coil of each actuator is moved along the axial direction thereof by the electromagnetic force. In addition, since each movable coil is formed such that the diameter L1 of the movable coil is longer than the diameter L2 of the center permanent magnet portion, as shown in FIG. 6, it is also possible to allow the motor 10 to receive a translational movement in the two directions of X and Y axes by controlling the current passed through the movable coil of each actuator. Consequently, the motor 10 is permitted to freely translate along the X and Y axes and/or rotate about the Z axis by controlling the current passed through the movable coil of each actuator. That is to say, by controlling the current passed through the electromagnets 30 to 35 and the actuators 50a, 50b and 50c, it is possible to allow the motor 10 to move relative to the housing with 6 degrees of freedom, that is, the rotational and translational movement of the motor 10 about three mutually perpendicular axes including the Z axis and in the three mutually perpendicular axes.

Three positional sensors 70, 71 and 72 (not shown) are attached in the housing 4 for monitoring the rotational movement of the motor 10 about the Z axis and/or the translational movement of the motor in the two directions of the X and Y axes. For example, the sensor 70 is capable of optically detecting a distance between the sensor 70 and a reflector plate 60 perpendicularly fixed on the supporting disc 13 near the actuator 50a. Similarly, another sensors 71 and 72 have the same capability. On the other hand, three positional sensor 73, 74 and 75 (not shown) are also attached in the housing 4 for monitoring the rotational movement of the motor 10 about the X and Y axes and/or the translational movement of the motor in the direction of the Z axis. For example, the sensor 73 is capable of optically detecting a distance between the sensor 73 and a reflector plate (not shown) horizontally fixed on the supporting disc Similarly, another sensors 74 and 75 have the same capability. It is not concerned that an eddy current sensor device is used as the positional sensor, which is capable detecting a distance between the eddy current sensor and a metal plate in accordance with an amount of eddy current loss resulting from irradiating a high frequency electric field from the eddy current sensor toward the metal plate. As described above, all electromagnets 30 to 35, all stators 51a, 51b and 51c (not shown) of the actuators 50a, 50b and 50c, and all positional sensors 70 to 75 are securely fixed to the housing 4 without the physical contact with the supporting disc 13.

An optimum amount of current passed through each electromagnet 30 to 35 and each actuator 50a, 50b and 50c is supplied from a control circuit 20 in such a manner as a feedback control. As shown in FIG. 7, the control circuit 20 includes an interface 21 capable of receiving outputs from the sensors and providing optimum control signals to the electromagnets 30 to 35 and the actuators 50a, 50b and 50c, an amplifier 22 for amplifying the control signals, an operation control device 23 for generating the control signals in accordance with the output signals from the sensors 70 to 75, a setting device 24 for setting stiffness value of the restoring element and damping factor value of the damping element and a critical value, etc., an electric power supply 25, and a driver circuit 26 for driving a feed motor 27 to transfer the housing 4 in the direction of the Z axis. Since the control signals for the electromagnets 30 to 35 and the actuators 50a, 50b and 50c are obtained by a multivariate matrix operation, a microcomputer capable of a high-speed operation is used as the operation control device 23. It is advantageous to the precision drilling method that since the motor 10 is supported in suspension by the electromagnetic force, any noises are not generated from a positional displacement of the motor 10 relative to the housing 4.

Therefore, there is no necessity for protecting the output signals of the positional sensors 70 to 75 from the noises. Speeds and feeds for drilling are also controlled by the control circuit 20.

In the first embodiment, a relation between the restoring and damping elements is represented by the equation (1), that is, $$P = C\sqrt{K \times m} \quad (1)$$

wherein, K is a stiffness value of the restoring element, P is a damping factor value of the damping element, C is a constant, and m is a total weight of the motor 10, the supporting disc 13 and the motor holder 12. Though the above equation (1) is adopted in the first embodiment, it is not concerned that another equation for providing the relation between the restoring and damping elements is used in the present invention. By the way, the magnitude of the electromagnetic force applied to the movable coil 55a, 55b or 55c of each actuator 50a, 50b or 50c is given by the equation (2), $$F = n \cdot I \cdot B \cdot L \quad (2)$$

wherein, n is the number of turns of the movable coil, I is a current passed through the movable coil, B is a magnetic flux density of the permanent magnet, and L is the length of the movable coil in a magnetic field. The magnitude of the electromagnetic force can be freely changed by controlling the current passed through the movable coil of each actuator 50a, 50b or 50c. In addition, since the current passed through each movable coil 55a, 55b or 55c is varied by an external force applied to the motor 10, it is possible to detect a variation of the external force as a variation of the current value passing through the movable coil.

On the other hand, the magnitude of the magnetic attraction force applied to the supporting disc 13 is given by the equation (3), that is, $$F = Q \cdot I^2 / D^2 \quad (3)$$

wherein, I is a current passed through a coil of each electromagnet 30 to 35, D is a distance between the supporting disc 13 and each electromagnet 30 to 35, and Q is a constant peculiar to a space existing between the supporting disc 13 and each electromagnet 30 to 35. When the distance D is small, an extremely large magnetic attraction force is applied to the supporting disc 13. The magnitude of the magnetic attraction force can be freely changed by controlling the current passed through the coil of each electromagnet 30 to 35. By the way, when the spindle 11 is rotated at a high speed, Coriolis force is applied to the motor, so that a precession of the motor 10 is easily induced. However, in the present invention, since the motor 10 can be strongly supported by the magnetic attraction force developed by each electromagnet 30 to 35, it is possible to effectively prevent the precession. In addition, inasmuch as the current passed through the coil of each electromagnet 30 to 35 is varied by the external force applied to the motor 10, it is also possible to detect the variation of the external force as a variation of the current passing through the coil.

In a word, since the motor 10 is supported to the housing 4 by the electromagnetic force developed by each actuator 50b and 50c, and the magnetic attraction force developed by each electromagnet 30 to 35, it is interpreted that the motor 10 is supported to the housing 4 through the restoring and damping elements. Therefore, the stiffness value of the restoring element and the damping factor value of the damping element can be freely changed by controlling the current passed through each electromagnet 30 to 35 and each actuator 50a, 50b, and 50c. In addition, inasmuch as it is possible to allow the motor 10 to move relative to the housing 4 with 6 degrees of freedom, that is, the rotational and translational movement of the motor 10 about three mutually perpendicular axes including the Z axis and in the three mutually perpendicular axes, the stiffness and damping factor values can be controlled with respect to each degree of freedom. In the first modification, the stiffness and damping factor values are represented by K(kx, ky, kz, kθx, kθy, kθz) and D(dx, dy, dz, dθx, dθy, dθz), respectively.

Figure 9:
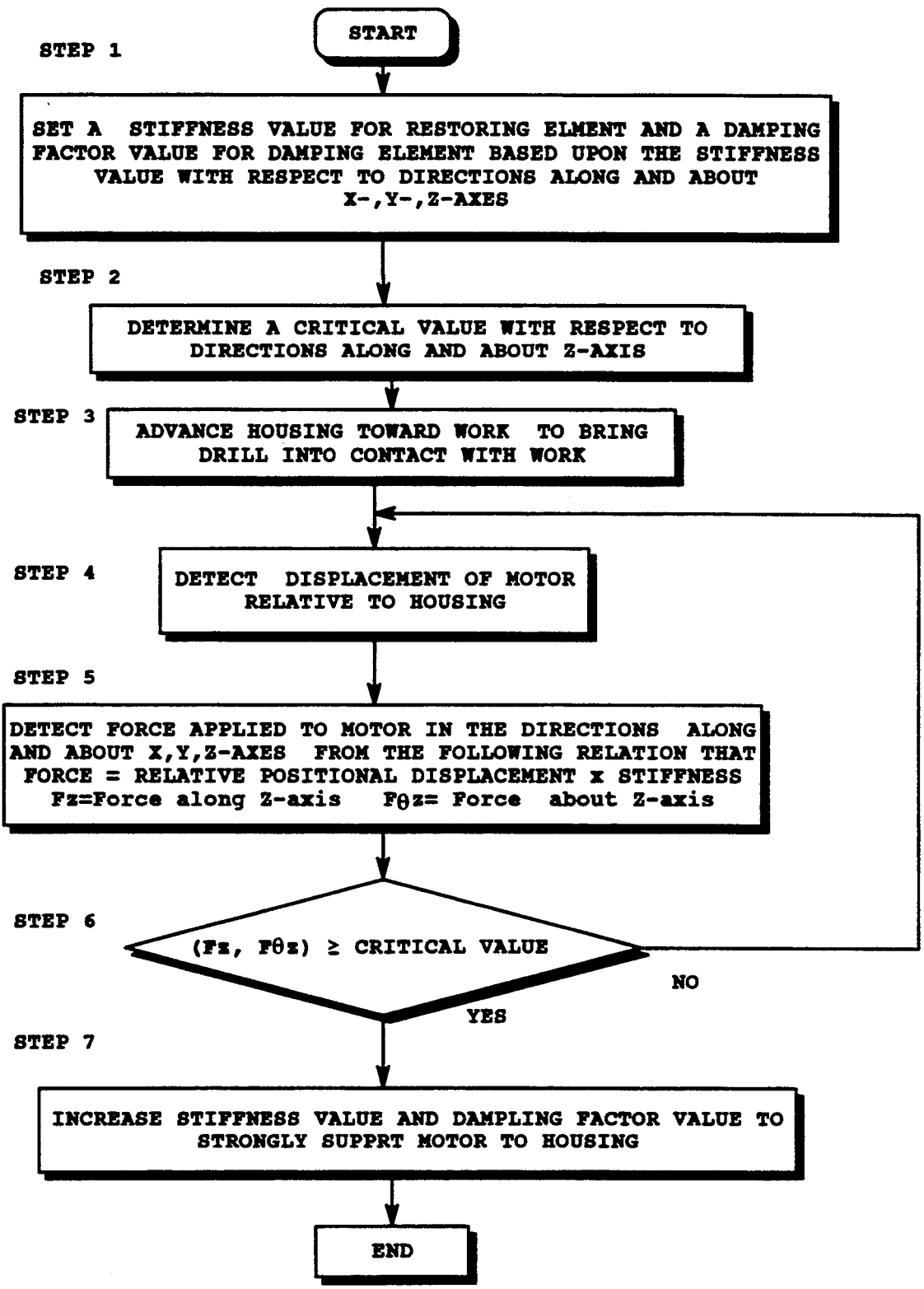
FIG. 9 is a flow chart helpful understanding the precision drilling method in the first embodiment
Figure 10:
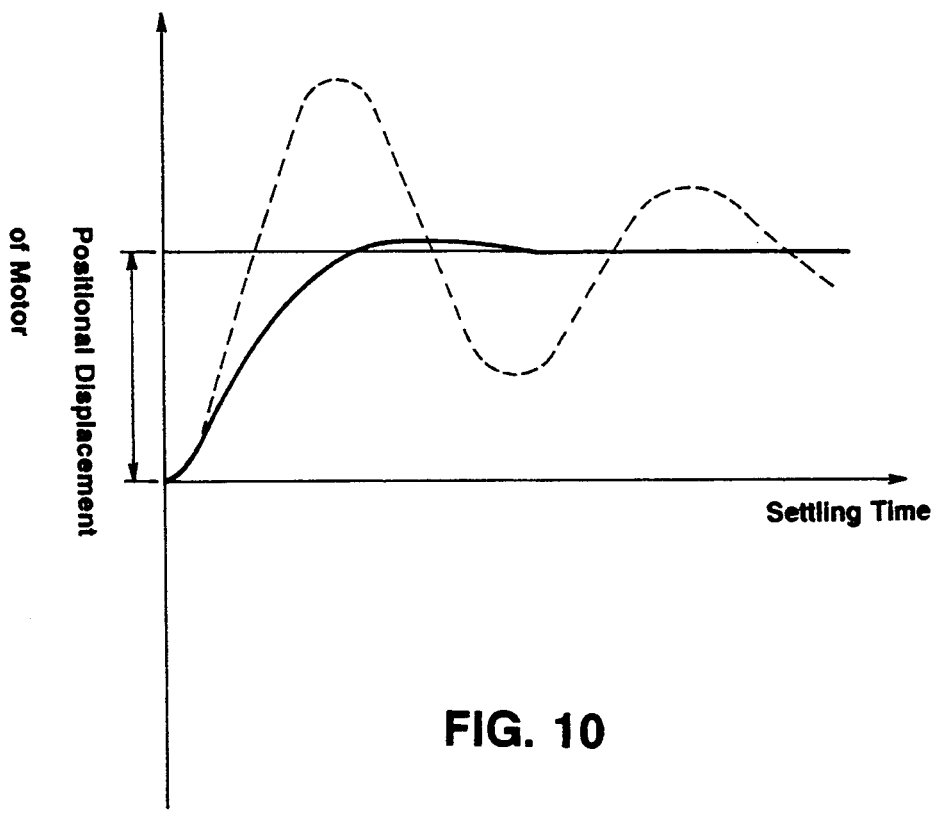
FIG. 10 shows a relation between a positional displacement of a motor and a settling time necessary for damping a vibration of the motor in the first embodiment.

The precision drilling method of the first embodiment for drilling a straight hole in the work, i.e., a printed circuit board, with a drill 6 by using the drilling apparatus described above is proceeded in accordance with a flow chart of FIG. 9. Before proceeding the precision drilling, the stiffness value is set to a first stiffness value K(kx1 ky1, kz1, kθx1, kθy1, kθz1) such that the positional displacement of the motor 10 is permitted in directions along and about the three mutually perpendicular axes including the Z axis to relieve a contacting pressure applied to the motor 10, when the drill 6 connected with the spindle 11 first comes into contact with the work (W), as shown in FIG. 8B. On the other hand, the damping factor value is set to a first damping factor value D(dx1, dy1, dz1, dθx1, dθy1, dθz1) each component of which is obtained by substituting a component of the first stiffness value for the equation (1). In addition, when a force applied to the motor 10 is greater than a critical value, control is made to increase at least one component of the first stiffness value, and at least one component of the first damping factor value. The critical value is also set before starting the precision drilling.

After programming the stiffness and damping factor values and the critical value, as described above, the housing 4 is transferred toward the work along the Z axis by the feed motor 27 while the drill 6 is rotated at the high speed by the motor 10, as shown in FIG. 8A. Though Japanese Patent Early Publication [KOUKAI] No. 61-244404 describes that a shallow hole is formed in the work with a short drill prior to being drilled a deep hole in the work with a long drill, there is no necessity for forming suchlike shallow hole in the work prior to the precision drilling of the present invention. A small force applied to the motor 10, which is caused by a high speed rotation of the spindle 11 and a transference of the Z table 5, is detected in accordance with an increase in the current passing through each electromagnet 30 to 35 and each actuator 50a, 50b and 50c. By controlling the current passed through each electromagnet 30 to 35 and each actuator 50a, 50b and 50c so as to minimize the force, the motor 10 is supported to the housing 4 without causing substantial vibration and the precession thereof. The positional displacement P(x, y, z, θx, θy, θz) of the motor 10 relative to the housing 4 is monitored by the sensors 70 to 75 all through the precision drilling, as shown in the STEP 4 of FIG. 9. Initial position of the motor 10 is defined as P(0, 0, 0, 0, 0, 0). Therefore, the initial position is not substantially varied until the drill contacts with the work. When the drill 6 rotating at the high speed is contacted with the work, the drill receives the contacting pressure, as shown in FIG. 8B. Since the stiffness value is set to the first stiffness value, the positional displacement of the motor 10 is permitted in the directions along and about the three mutually perpendicular axes to relieve the contacting pressure without substantially slipping the top of the drill 6 on the work, for example, the drill 6 and the motor 10 is inclined against the Z axis, as shown in FIG. 8C. Therefore, since an internal stress of the drill 6 caused by the contacting pressure is relieved by the positional displacement of the motor 10, a breakage of the drill 6 is effectively prevented. On the other hand, when a vibration of the motor 10 induced by the positional displacement of the motor is damped within a long settling time period, as shown by the dotted line in FIG. 10, there is a problem that a larger hole than the diameter of the drill is drilled in the work. However, in the present invention, since the damping factor value is set to the first damping value, the vibration of the motor 10 is damped within a short settling time period, as shown by the straight line in FIG. 10, so that the straight hole having the substantial same diameter as the drill is readily drilled in the work. By the way, the force F applied to the motor 10 is represented by the equation (4), as shown in STEP 5 of the flow chart of FIG. 9, $$F(x, y, z, \theta x, \theta y, \theta z) = P(x, y, z, \theta x, \theta y, \theta z) \cdot K(kx, ky, kz, k\theta x, k\theta y, k\theta z) \quad (4)$$

When a component F(z) of the force is greater than a critical value Fc(z) or a component F(θz) of the force is greater than a critical value Fc(θz), as shown in STEP 6 of the flow chart of FIG. 9, at least one component of the first stiffness value is increased such that the positional displacement P(x1, y1, z1, x1, θy1, θz1) of the motor 10 is rapidly restored to a vertical position P(0, 0, z2, 0, 0, θz2), as shown in FIG. 8D, and then the motor is stably held for drilling the straight hole. The Fc(z) is a critical force in direction of the Z axis. On the other hand, the Fc(θz) is a critical force about the Z axis. Though the above equation (4) is adopted in the first embodiment, it is not concerned that another equation for providing the force applied to the motor 10 is used in the present invention. In addition, though the Fc(z) and Fc(θz) are used as the critical values in the first embodiment, it is not concerned that an optional combination of components of Fc(x, y, z, θx, θy, θz) is adopted as the critical value. At least one component of the first damping factor value is increased corresponding to thus increased component of the stiffness value in accordance with the equation (1), so that the straight hole can be drilled in the work without causing any vibration of the motor 10 and positional deviation of the straight hole in the work. Subsequently, the straight hole is formed in the work with the drill by feeding the housing 4 toward the work along the Z axis, as shown in FIG. 8E.

Figure 11:
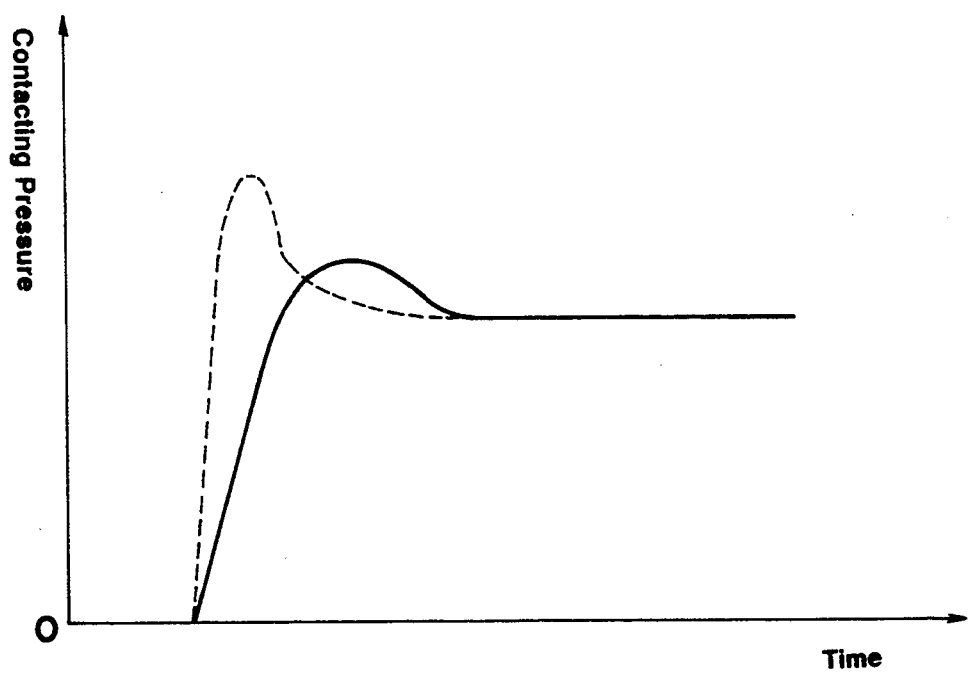
FIG. 11 shows a difference of a relaxation curve of a contacting pressure applied to the motor between drilling methods of the prior art and the present invention.

By the way, an advantage of the precision drilling of the present invention is also explained by the diagram of FIG. 11. That is, if the motor is not movably supported to a housing, a relaxation curve of the contacting pressure applied to the motor is shown by the dotted line of FIG. 11. In this case, the contacting pressure instantaneously increases to a maximum pressure value, so that there is a possibility of causing the breakage of the drill. However, when the precision drilling of the present invention is proceeded by using the drilling apparatus of the first embodiment, a relaxation curve of the contacting pressure applied to the motor 10 is shown by the straight line of FIG. 11. That is, since the contacting pressure is relieved by the positional displacement of the motor, the rate of increase in the contacting pressure is slower than that of the former case. The maximum value of the contacting pressure is also smaller than that of the former case. Therefore, the breakage of the drill is effectively prevented by proceeding the precision drilling method of the present invention.

Figure 12:
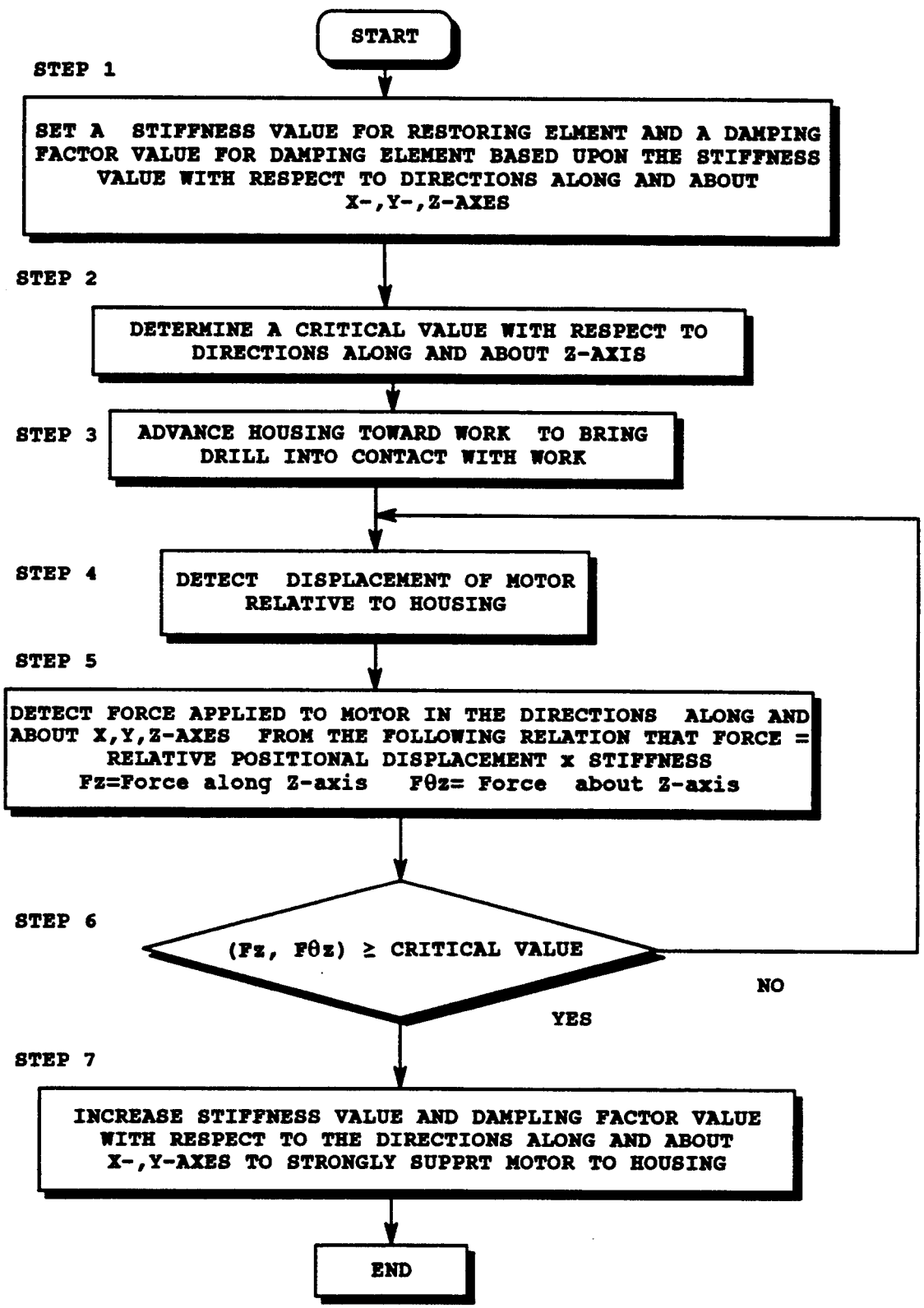
FIG. 12 is a flow chart helpful understanding the precision drilling method in a first modification of the first embodiment.

Another modification of the first embodiment is described in accordance with the flow chart of FIG. 12. The stiffness value is set to the first stiffness value K(kx1, ky1, kz1, kθx1, kθy1, kθz1) such that the positional displacement of the motor 10 is permitted in the directions along and about the three perpendicular axes to relieve the contacting pressure applied to the motor 10. The damping factor value is also set to the first damping factor value D(dx1, dy1, dz1, dθx1, dθy1, dθz1) each component of which is obtained by substituting the component of the first stiffness value for the equation (1). Subsequently, the precision drilling process similar to the first embodiment is performed. When the F(z) is greater than the Fc(z) or the F(θz) is greater than the Fc(θz), only components K(kx1, ky1, kθx1, kθy1) of the first stiffness value are increased such that the positional displacement P(x1, y1, z1, θx1, θy1, θz1) of the motor 10 is rapidly restored to the vertical position P(0, 0, z2, 0, 0, θz2), and then the motor is stably held for drilling the straight hole in the work. On the other hand, only components D(dx1, dy1, dθx1, dθy1) of the first damping factor value are increased in accordance with the equation (1). Subsequently, the straight hole is formed in the work with the drill by feeding the housing 4 toward the work along the Z axis.

Figure 13:
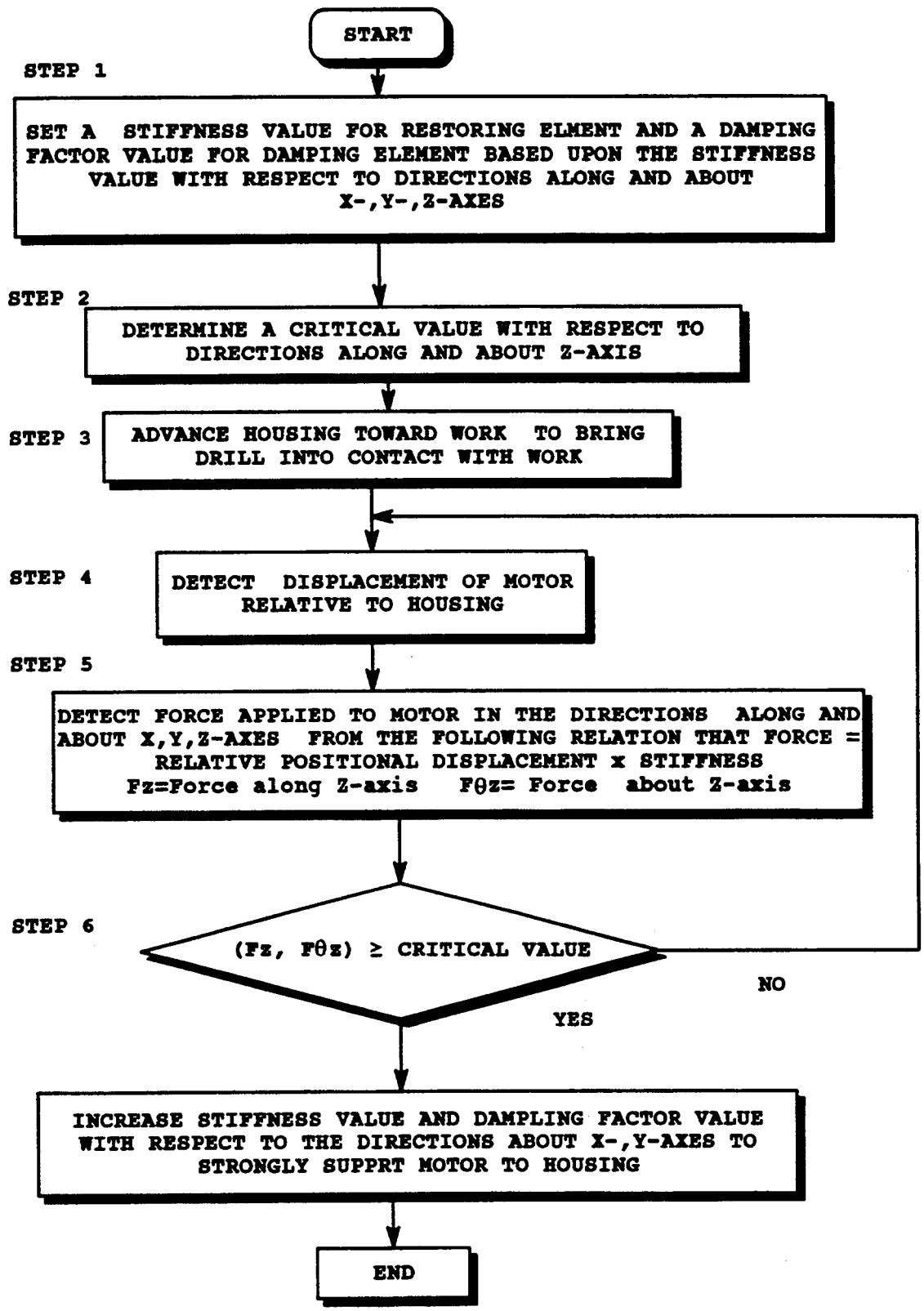
FIG. 13 is a flow chart helpful understanding the precision drilling method in a second modification of the first embodiment.

In another modification of the first embodiment, when the F(z) is greater than the Fc(z) or the F(θz) is greater than the Fc(θz), only components K(kθx1, kθy1) of the first stiffness value are increased such that the positional displacement of the motor 10 is rapidly restored to the vertical position, and then the motor is stably held for drilling the straight hole in the work, as shown in the flow chart of FIG. 13. On the other hand, only components D(dθx1, dθy1) of the first damping factor value are increased in accordance with the equation (1).

Figure 14:
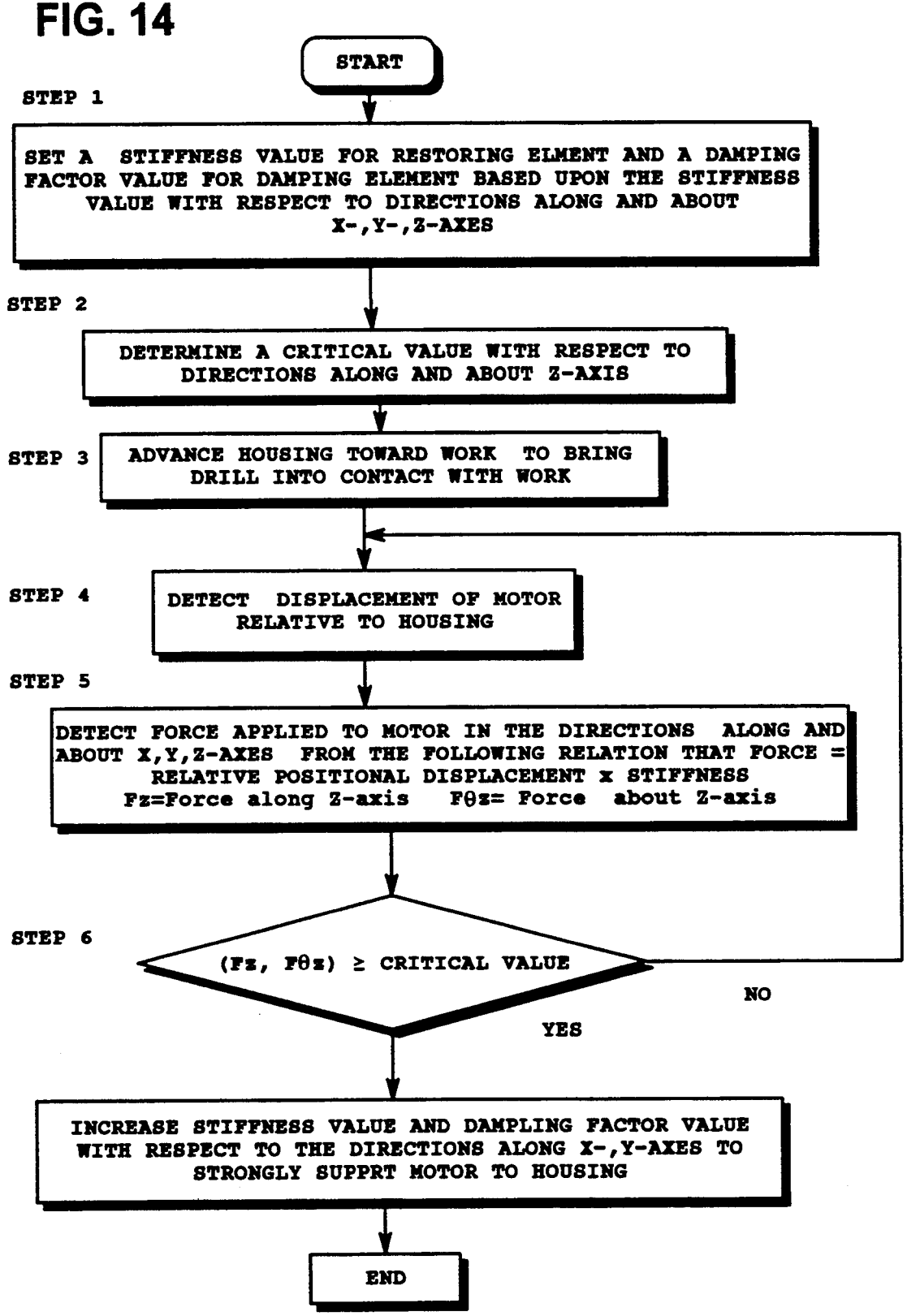
FIG. 14 is a flow chart helpful understanding the precision drilling method in a third modification of the first embodiment.

In another modification of the first embodiment, when the F(z) is greater than the Fc(z) or the F(θz) is greater than the Fc(θz), only components K(kx1, ky1) of the first stiffness value are increased such that the positional displacement of the motor 10 is rapidly restored to the vertical position of the motor, and then the motor is stably held for drilling the straight hole in the work, as shown in the flow chart of FIG. 14. On the other hand, only components D(dx1, dy1) of the first damping factor value are increased in accordance with the equation (1).

In another modification of the first embodiment, when the F(z) is greater than the Fc(z) or the F(θz) is greater than the Fc(θz), the first stiffness value is increased to a second stiffness value K(kx2, ky2, kz2, kθx2, kθy2, kθz2) such that the positional displacement of the motor 10 is rapidly restored to the vertical position of the motor, and then the motor is stably held for drilling the straight hole in the work. On the other hand, the first damping factor value is increased to a second damping factor value D(dx2, dy2, dz2, dθx2, dθy2, dθz2) each component of which is obtained by substituting a component of the second stiffness value for the equation (1). After restoring the position of the motor 10, the straight hole is formed in the work with the drill by feeding the housing 4 toward the work along the Z axis.

In another modification of the first embodiment, when the F(z) is greater than the Fc(z) or the F(θz) is greater than the Fc(θz), only components K(kx1, ky1, kθz1) of the first stiffness value are increased such that the positional displacement of the motor 10 is rapidly restored to the vertical position of the motor, and then the motor is stably held for drilling the straight hole in the work. On the other hand, only components D(dx1, dy1, dθz1) of the first damping factor value are increased in accordance with the equation (1).

In another modification of the first embodiment, when the F(z) is greater than the Fc(z) or the F(θz) is greater than the Fc(θz), only components K(kx1, ky1, kz1) of the first stiffness value are increased such that the positional displacement of the motor 10 is rapidly restored to the vertical position of the motor, and then the motor is stably held for drilling the straight hole in the work. On the other hand, only components D(dx1, dy1, dz1) of the first damping factor value are increased in accordance with the equation (1).

In another modification of the first embodiment, the stiffness value is set to the first stiffness value K(kx1, ky1, kz1, kθx1, kθy1, kθz1) such that the positional displacement of the motor 10 is permitted only in directions along and about two mutually perpendicular axes perpendicular to the Z axis to relieve the contacting pressure applied to the motor 10. When the a component F(x) of the force is greater than a critical value Fc(x) or a component F(θx) of the force is greater than a critical value Fc(θx), at least one component of K(kx1, ky1, kθx1, kθy1) of the first stiffness value is increased such that the positional displacement of the motor 10 is rapidly restored to the vertical position of the motor, and then the motor is stably held for drilling the straight hole in the work. Though the Fc(x) and Fc(θx) are used as the critical values in this modification, it is not concerned that an optional combination of components Fc(x, y, θx, θy,) is adopted as the critical value. In addition, it is preferred that when a current passed through the motor is greater than a critical current, at least one component of K(kx1, ky1, kθx1, kθy1) of the first stiffness value is increased for rapidly restoring the position of the motor. On the other hand, the first damping factor value is increased corresponding to thus increased component of the stiffness value in accordance with the equation (1).

In another modification of the first embodiment, the stiffness value is set to a first stiffness value K(kx1, ky1, kz1, kθx1, kθy1, kθz1) such that the positional displacement of the motor 10 is permitted only in directions about the two mutually perpendicular axes perpendicular to the Z axis to relieve the contacting pressure applied to the motor 10. When a component F(θy) of the force is greater than a critical value Fc(θy) and/or a component F(θx) of the force is greater than a critical value Fc(θx), at least one component of K(kθx1, kθy1) of the first stiffness value is increased such that the positional displacement of the motor 10 is rapidly restored to the vertical position of the motor, and then the motor is stably held for drilling the straight hole in the work. In addition, it is preferred that when the current passed through the motor is greater than the critical current, at least one component of K(kθx1, kθy1) of the first stiffness value is increased for rapidly restoring the position of the motor. On the other hand, the first damping factor value is increased corresponding to thus increased component of the stiffness value in accordance with the equation (1).

In another modification of the first embodiment, the stiffness value is set to a first stiffness value K(kx1, ky1, kz1, kθx1, kθy1, kθz1) such that the positional displacement of the motor 10 is permitted only in directions along the two mutually perpendicular axes perpendicular to the Z axis to relieve the contacting pressure applied to the motor 10. When a component F(x) of the force is greater than a critical value Fc(x) and/or a component F(y) of the force is greater than a critical value Fc(y), at least one component of K(kx1, ky1) of the first stiffness value is increased such that the positional displacement of the motor 10 is rapidly restored to the vertical position of the motor, and then the motor is stably held for drilling the straight hole in the work. In addition, it is preferred that when the current passed through the motor 10 is greater than the critical current, at least one component of K(kx1, ky1) of the first stiffness value is increased for rapidly restoring the position of the motor. On the other hand, the first damping factor value is increased corresponding to thus increased component of the stiffness value in accordance with the equation (1).

In another modification of the first embodiment, the stiffness value is set to a first stiffness value K(kx1, ky1, kz1, kθx1, kθy1, kθz1) such that the positional displacement of the motor 10 is permitted only in directions along the three mutually perpendicular axes including the Z axis to relieve the contacting pressure applied to the motor 10. When a component F(x) of the force is greater than a critical value Fc(x), at least one component of K(kx1, ky1, kz1) of the first stiffness value is increased such that the positional displacement of the motor 10 is rapidly restored to the vertical position of the motor, and then the motor is stably hold for drilling the straight hole in the work. Though the Fc(x) is used as the critical value in this modification, it is not concerned that an optional combination of components Fc(x, y, z) is adopted as the critical value. In addition, it is preferred that when the current passed through the motor is greater than the critical current, at least one component of K(kx1, ky1, kz1) of the first stiffness value is increased for rapidly restoring the position of the motor. On the other hand, the first damping factor value is increased corresponding to thus increased component of the stiffness value in accordance with the equation (1).

In another modification of the first embodiment, the stiffness value is set to a first stiffness value K(kx1, ky1, kz1, kθx1, kθy1, kθz1) such that the positional displacement of the motor 10 is permitted only in directions along the Z axis and about the two mutually perpendicular axes perpendicular to the Z axis to relieve the contacting pressure applied to the motor 10. When a component F(z) of the force is greater than a critical value Fc(z), at least one component of K(kz1, kθx, kθy) of the first stiffness value is increased such that the positional displacement of the motor 10 is rapidly restored to the vertical position of the motor, and then the motor is stably held for drilling the straight hole in the work. Though the Fc(z) is used as the critical value in this modification, it is not concerned that an optional combination of components Fc(z, $\theta x$, $\theta y$) is adopted as the critical value. In addition, it is preferred that when the current passed through the motor is greater than the critical current, at least one component of K(kz1, k$\theta$x1, k$\theta$y1) of the first stiffness value is increased for rapidly restoring the position of the motor. On the other hand, the first damping factor value is increased corresponding to thus increased component of the stiffness value in accordance with the equation (1).

In another modification of the first embodiment, the stiffness value is set to a first stiffness value K(kx1, ky1, kz1, k$\theta$x1, k$\theta$y1, k$\theta$z1) such that the positional displacement of the motor 10 is permitted only in direction along the Z axis to relieve the contacting pressure applied to the motor 10. When a component F(z) of the force is greater than a critical value Fc(z), a component of K(kz1) of the first stiffness value is increased to give a relatively strong support of the motor 10. It is preferred that when the current passed through the motor 10 is greater than the critical current, the K(kz1) of the first stiffness value is increased. On the other hand, a component D(kz1) of the first damping factor value is increased by substituting thus increased component K (kz1) for the equation (1), so that the vibration of the motor 10 is rapidly damped. Subsequently, the straight hole is formed in the work with the drill by feeding the housing 4 toward the work along the Z axis.

Figure 16:
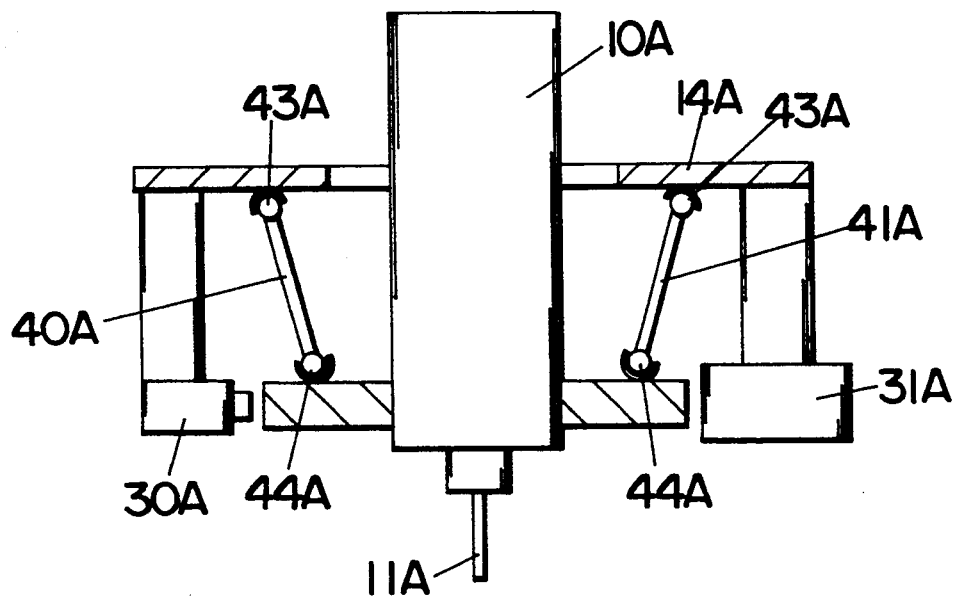
FIG. 16 is a vertical cross sectional view of the supporting system of the second embodiment.
Figure 15:
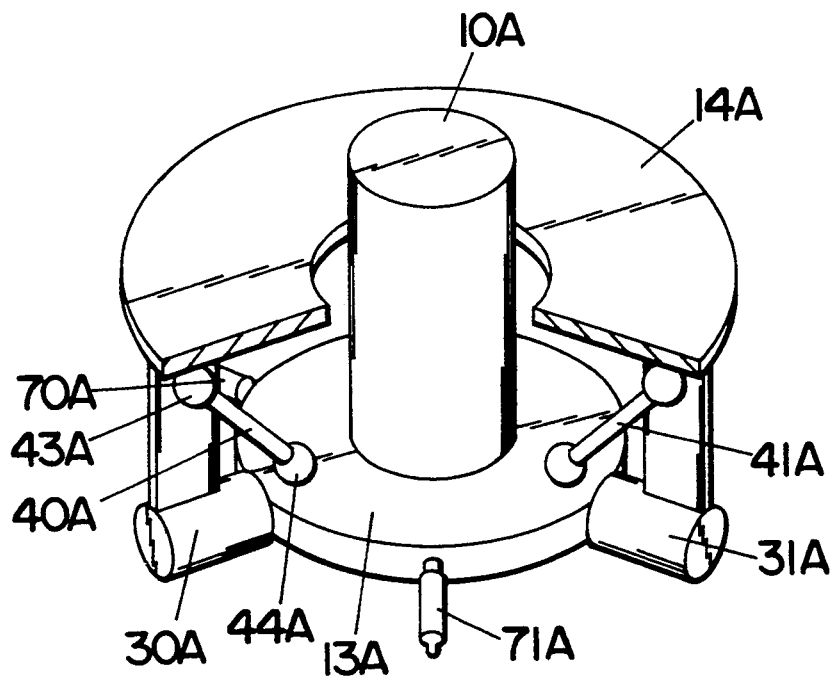
FIG. 15 is a partially cut-away perspective view illustrative of a motor supporting system in a second embodiment of the present invention.
Figure 18:
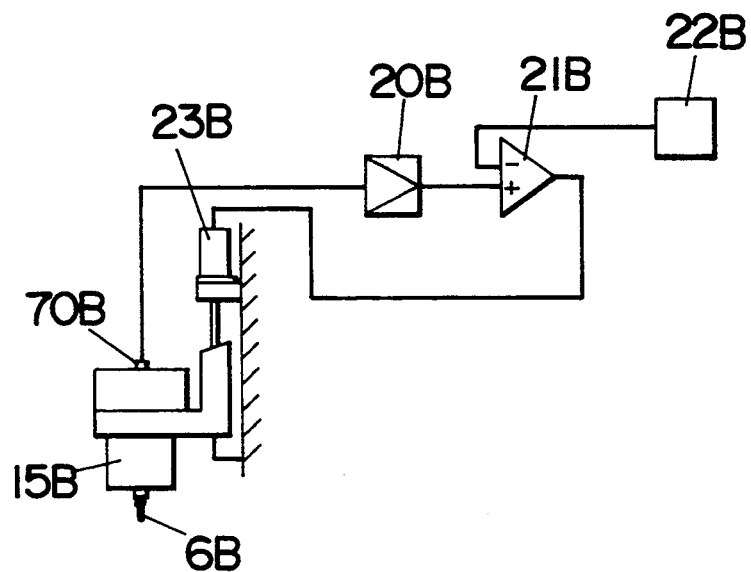
FIG. 18 is a schematic diagram of a drilling apparatus of the prior art.
Figure 17:
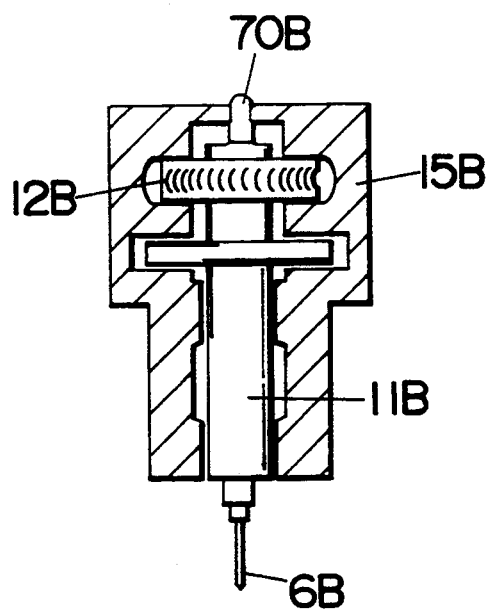
FIG. 17 is a vertical cross sectional view illustrative of the inside of a spindle housing of the prior art.

Second Embodiment <FIGS. 15 and 16>

As shown in FIG. 15, a supporting disc 13A is attached to a motor 10A such that the supporting disc 13A are arranged perpendicularly to the axial direction of a rotatable spindle 11A of the motor 10A. The axial direction of the spindle 11A is substantially equal to the direction of the Z axis defined in the first embodiment. A plane perpendicular to the Z axis is defined as a X-Y plane having orthogonal X and Y axes. Three cylindrical electromagnets 30A, 31A and 32A (not shown) are respectively located 120° apart around the periphery of the supporting disc 13A such that three center axes of the cylindrical electromagnets 30A to 32A intersect at a point existing on the axis of the spindle 11A. The electromagnets 30A to 32A are also securely fixed to a housing without physical contact with the supporting disc 13A. The supporting disc 13A is made of a magnetic material, at least in the vicinity of the three electromagnets 30A to 32A. On the other hand, a stationary disc 14A has a center hole the diameter of which is larger than that of the motor 10A. The stationary disc 14A is attached to the housing such that the stationary disc 14A is positioned in parallel with the supporting disc 13A, as shown in FIG. 15. The stationary disc 14A is also connected through three supporting rods 40A, 41A and 42A (not shown), each of which has ball joint portions 43A and 44A at the both ends thereof, with the supporting disc 13A. It is not concerned that more than three supporting rods are used for connecting between the stationary and supporting discs 13A and 14A. In addition, the supporting rods 40A to 42A are arranged between the supporting and stationary discs 13A and 14A such that three axes of the supporting rods 40A to 42A intersect at an intersectional point existing on the axis of the spindle 11A. It is also preferred that the intersectional point is in agreement on a position of the top of the drill 6A connected with the spindle 11A. By controlling current passed through the electromagnets 30A to 32A, it is possible to allow the motor 10A to move with 2 degree of freedom, that is, a rotational movement only along the X and Y axes. Two positional sensors 70A and 71A are attached to the housing around the supporting disc 13A for monitoring the rotational movement of the motor 10A.

Before proceeding the precision drilling of the second embodiment, a stiffness value is set to a first stiffness value K(k$\theta$x1, k$\theta$y1) such that the rotational movement of the motor 10A only along the X and Y axes is permitted to relieve a contacting pressure applied to the motor 10A when the drill 6A comes into contact with the work. On the other hand, a damping factor value is set to a first damping factor value D(d$\theta$x1, d$\theta$y1). In addition, when a current passing through the motor 10A is greater than a critical current, control is made to increase at least one component of K(k$\theta$x1, k$\theta$y1) of the first stiffness value and at least one component of D(d$\theta$x1, d$\theta$y1) of the first damping factor value. The critical current is also set before starting the precision drilling of the second embodiment.

After programming the stiffness and damping factor values and the critical current, as described above, the housing is transferred toward the work along the Z axis by a feed motor while the drill 6A is rotated at a high speed by the motor 10A. When the drill 6A rotating at the high speed is contacted with the work, the drill 6A receives the contacting pressure. Since the stiffness value is set to the first stiffness value, the rotational movement of the motor 10A is permitted to relieve the contacting pressure without substantially slipping the top of the drill 6A on the work. On the other hand, since the damping factor value is set to the first damping value, a vibration of the motor 10 induced by the rotational movement of the motor 10A is rapidly damped. And then, when the current passed through the motor 10A is greater than the critical current, at least one component of the first stiffness value is increased such that the rotational movement of the motor 10A is rapidly restored to a vertical position along the Z axis, and then the motor is stably hold for drilling the straight hole. For restoring the position of the motor, an optimum amount of current passed through each electromagnet 30A to 33A is controlled in such a manner as a feedback control similar to the first embodiment. At least one component of the first damping factor value is also increased, so that the straight hole can be drilled in the work without causing any vibration of the motor 10A and positional deviation of the straight hole in the work. Subsequently, the straight hole is formed in the work with the drill 6A by feeding the housing toward the work along the Z axis.

What is claimed is:

1. A precision drilling method for drilling a hole in a work with a drill unit having a drill bit, said drill unit being movably supported to a housing by electromagnetic force consisting of separately controllable restoring and damping elements, said method being characterized to vary at least one of stiffness of said restoring element and damping factor of said damping element between before and after said drill bit comes into engagement into said work.

2. A precision drilling method for drilling a hole in a work with a drill unit having a drill bit, said drill unit being movably supported to a housing by electromagnetic force consisting of separately controllable restoring and damping elements, said housing having a vertical axis along which it is advanced toward said work for drilling, said method comprising the steps of:

setting a stiffness of said restoring element to a first stiffness value and a damping factor of said damping element to a first damping value in order to give a relatively weak support of permitting said drill unit to displace by a relatively great extent in a direction of relieving a contacting pressure applied to said drill unit when said drill bit first comes into contact with said work;

monitoring a force applied to said drill unit when said drill bit first comes into contact with said work with respect to at least one of the directions along and about three mutually perpendicular axes including said vertical axis;

increasing said stiffness from said first stiffness value to a second stiffness value in response to said monitored force becoming greater than a critical value to thereby give a relatively strong support capable of rapidly restoring the position of said drill unit and holding said drill unit stably for proceeding the drilling of the hole.

3. A precision drilling method for drilling a hole in a work with a drill unit having a drill bit, said drill unit being movably supported to a housing by electromagnetic force consisting of separately controllable restoring and damping elements, said housing having a vertical axis along which it is advanced toward said work for drilling, said method comprising the steps of:

setting a stiffness of said restoring element to a first stiffness value and a damping factor of said damping element to a first damping value in order to give a relatively weak support of permitting said drill unit to displace by a relatively great extent in a direction of relieving a contacting pressure applied to said drill unit when said drill bit first comes into contact with said work;

monitoring a force applied to said drill unit when said drill bit first comes into contact with said work with respect to at least one of the directions along and about three mutually perpendicular axes including said vertical axis;

increasing said stiffness from said first stiffness value to a second stiffness value as well as varying said damping factor from said first damping value to a second damping value in response to said force becoming greater than a critical value to thereby give a relatively strong support capable of rapidly restoring the position of said drill unit without causing substantial vibration and holding said drill unit stably for proceeding the drilling of the hole.

4. A precision drilling method as set forth in claims 2 or 3, wherein said force is measured in terms of a displacement amount of said drill unit relative to said housing with respect to at least one of the directions along and about said three mutually perpendicular axes.

5. A precision drilling method as set forth in claims 2 or 3, wherein said force is limited to the force applied to said drill unit in the direction of at least along and about said vertical axis.

6. A precision drilling method as set forth in claims 2 or 3, wherein said force is limited to the combination of the forces applied along and about said vertical axis.

7. A precision drilling method as set forth in claims 2 or 3, wherein said drill unit is permitted to move relative to said housing in directions along and about said three mutually perpendicular axes and is supported to said housing with said restoring and damping elements acting in these direction.

8. A precision drilling method as set forth in claims 2 or 3, wherein said drill unit is permitted to move relative to said housing substantially only in directions along said three mutually perpendicular axes and is supported to said housing with said restoring and damping elements acting in these direction.

9. A precision drilling method as set forth in claims 2 or 3, wherein said drill unit is permitted to move relative to said housing substantially only in directions along and about two mutually perpendicular axes perpendicular to said vertical axis and is supported to said housing with said restoring and damping elements acting in these direction.

10. A precision drilling method as set forth in claims 2 or 3, wherein said drill unit is permitted to move relative to said housing substantially only in the directions along two mutually perpendicular axes perpendicular to said vertical axis and is supported to said housing with said restoring and damping elements acting in these directions.

11. A precision drilling method as set forth in claims 2 or 3, wherein said drill unit is permitted to move relative to said housing substantially only in directions along said vertical axis and about two mutually perpendicular axes perpendicular to said vertical axis and is supported to said housing with said restoring and damping elements acting in these direction.

12. A precision drilling method as set forth in claims 2 or 3, wherein said drill unit is permitted to move relative to said housing substantially only in the directions about two mutually perpendicular axes perpendicular to said vertical axis and is supported to said housing with said restoring and damping elements acting in these directions.

13. A precision drilling method as set forth in claims 2 or 3, wherein said drill unit is permitted to move relative to said housing substantially only in direction along said vertical axis and is supported to said housing with said restoring element and damping elements acting in that direction.

14. A precision drilling method as set forth in claim 3, wherein said restoring and damping elements are controlled to vary their stiffness and damping factor in order to allow said drill unit to receive restoring translational and rotational movements along and about said three mutually perpendicular axes.

15. A precision drilling method as set forth in claim 3, wherein said restoring and damping elements are controlled to vary their stiffness and damping factor in order to allow said drill unit to receive restoring translational movement only in directions of said three mutually perpendicular axes.

16. A precision drilling method as set forth in claim 3, wherein said restoring and damping elements are controlled to vary their stiffness and damping factor in order to allow said drill unit to receive restoring translational and rotational movements only along and about two mutually perpendicular axes perpendicular to said vertical axis.

17. A precision drilling method as set forth in claim 3, wherein said restoring and damping elements are controlled to vary their stiffness and damping factor in order to allow said drill unit to receive restoring translational and rotational movements only along two mutually perpendicular axes perpendicular to said vertical axis and about said vertical axis.

18. A precision drilling method as set forth in claim 3, wherein said restoring and damping elements are controlled to vary their stiffness and damping factor in order to allow said drill unit to receive restoring translational movement only along two mutually perpendicular axes perpendicular to said vertical axis.

19. A precision drilling method as set forth in claim 3, wherein said restoring and damping elements are controlled to vary their stiffness and damping factor in order to allow said drill unit to receive restoring rotational movement only about two mutually perpendicular axes perpendicular to said vertical axis.

* * * * *